(12) United States Patent
Atakan

(10) Patent No.: US 11,597,678 B2
(45) Date of Patent: Mar. 7, 2023

(54) CEMENT CHEMISTRIES

(71) Applicant: Solidia Technologies, Inc., Piscataway, NJ (US)

(72) Inventor: Vahit Atakan, Princeton, NJ (US)

(73) Assignee: Solidia Technologies, Inc., Piscataway, NJ (US)

(*) Notice: Subject to any disclaimer, the term of this patent is extended or adjusted under 35 U.S.C. 154(b) by 0 days.

(21) Appl. No.: 16/283,080

(22) Filed: Feb. 22, 2019

(65) Prior Publication Data

US 2019/0256416 A1 Aug. 22, 2019

Related U.S. Application Data

(60) Provisional application No. 62/633,959, filed on Feb. 22, 2018.

(51) Int. Cl.
*C04B 24/04* (2006.01)
*C04B 28/04* (2006.01)
(Continued)

(52) U.S. Cl.
CPC .............. *C04B 12/007* (2021.05); *C04B 9/06* (2013.01); *C04B 24/04* (2013.01); *C04B 28/04* (2013.01);
(Continued)

(58) Field of Classification Search
CPC ........... C04B 7/02; C04B 9/06; C04B 14/043; C04B 24/04; C04B 28/00; C04B 28/04; C04B 28/188; C04B 28/24; C04B 28/30; C04B 2103/302; C04B 2111/00; C04B 2111/00017; C04B 2111/00025; C04B 2111/1025; C04B 40/029; C04B 40/0231;
(Continued)

(56) References Cited

U.S. PATENT DOCUMENTS 3,511,674 A * 5/1970 Harris .................... C01B 33/22
106/690
3,798,266 A * 3/1974 Bottaccio ................ C07C 51/08
562/584
(Continued)

FOREIGN PATENT DOCUMENTS

WO 2016/054602 A1 4/2016
WO 2017/192938 A1 11/2017

OTHER PUBLICATIONS

Anne Egger, Rock and Minerals: The Silicate Minerals, Sep. 16, 2013, https://web.archive.org/web/20130916165934/https://www.visionlearning.com/en/library/Earth-Science/6/The-Silicate-Minerals/140 (Year: 2013).*

(Continued)

*Primary Examiner* — Kevin E Yoon
*Assistant Examiner* — Marites A Guino-O Uzzle
(74) *Attorney, Agent, or Firm* — Dentons US LLP

(57) ABSTRACT

A method of curing a low Ca/Mg cement composition is described that includes providing a predetermined quantity of the low Ca/Mg cement composition in uncured form; and reacting the uncured low Ca/Mg cement composition with a reagent chemical for a time sufficient to cure said cementitious material, wherein said reagent chemical is a compound synthesized from $CO_2$ and comprises dicarboxylic acids, tricarboxylic acids, or alpha-hydroxycarboxylic acids.

24 Claims, 1 Drawing Sheet

(51) Int. Cl.
  *C04B 28/24* (2006.01)
  *C04B 40/02* (2006.01)
  *C04B 9/06* (2006.01)
  *C04B 12/00* (2006.01)
  *C04B 28/28* (2006.01)
  *C04B 28/18* (2006.01)
  *C04B 111/00* (2006.01)

(52) U.S. Cl.
  CPC .............. *C04B 28/18* (2013.01); *C04B 28/24* (2013.01); *C04B 28/28* (2013.01); *C04B 40/029* (2013.01); *C04B 28/188* (2013.01); *C04B 2111/00017* (2013.01); *C04B 2111/0025* (2013.01)

(58) Field of Classification Search
  CPC . C04B 2111/0025; C04B 12/007; C04B 9/00; C04B 28/18; C04B 28/28; C04B 22/064; C04B 22/062; C04B 40/02
  See application file for complete search history.

(56) References Cited

U.S. PATENT DOCUMENTS

| | | | | |
|---|---|---|---|---|
| 4,997,484 A * | 3/1991 | Gravitt | ................ | C04B 40/0039 106/DIG. 1 |
| 5,030,267 A * | 7/1991 | Vlnaty | ..................... | C05G 5/30 71/64.11 |
| 7,018,466 B2 * | 3/2006 | Suzuki | ................... | C04B 12/04 106/608 |
| 8,016,937 B2 | 9/2011 | Schumacher et al. | | |
| 2010/0313794 A1 * | 12/2010 | Constantz | ............... | C04B 28/04 106/706 |
| 2013/0313794 A1 | 11/2013 | Bach et al. | | |
| 2016/0031757 A1 * | 2/2016 | Atakan | ................. | C04B 28/188 106/640 |
| 2017/0204010 A1 | 7/2017 | Atakan | | |
| 2017/0320781 A1 * | 11/2017 | Atakan | .................. | C04B 28/18 |

OTHER PUBLICATIONS

Joseph Ceithaml, The Synthesis of Tricarboxylic Acids by Carbon Dioxide Fixation in Parsley Root Preparations Oct. 22, 1948, Journal of Biological Chemistry, 178, 133 (Year: 1948).*
Gurley ("To Cure or Not to Cure?", 2011, accessed from precast. org) (Year: 2011).*
Mursa etal ("Solubility Rules", 2019, accessed from chem.libretexts. org) (Year: 2109).*
Gurnnasson et al. ("Amorphous Silica Solubility and the Thermodynamic Properties of H4SiO4 in the Range of 0 ° C. to 350 ° C. at Psat", 2000, Geochimica et Cosmochimica Acta, vol. 64, No. 13) (Year: 2000).*
Purdue (18.2 The Chemistry of CO2) [Retrieved on Oct. 27, 2021 <URL: https://chemed.chem.purdue.edu/genchem/demosheets/18.2. html>] (Year: 2021).*
Uptima (Citric Acid) [Retrieved on Oct. 27, 2021 <URL: https://www.interchim.fr/ft/6/67341A.pdf] (Year: 2021).*
Hard soft (Hard and Soft Water, Silicic acid in water) [Retrieved on Oct. 27, 2021 <URL: http://hardsoftwater.com/silicic-acid-in-water/>] (Year: 2018).*
Feeco (Calcination) [Retrieved on Oct. 27, 2021 <URL:https://feeco.com/calcination/>] (Year: 2021).*
"Citric acid", Wikipedia, Feb. 21, 2018, p. 3, retrieved Apr. 16, 2019 at: https://en.wikipedia.org/wlindex/php? title=Citric_acid&oldid= 826855968.
"Calcium oxalate", Wikipedia, Jan. 25, 2018, p. 2, retrieved Apr. 16, 2019 at: https://en.wikipedia.org/w/index/php?title=Cialcium_oxalate &oldid=822312426.
Fournier: "The solubility of amorphous silica in water at high temperatures and high pressures", American Mineralogist, vol. 62, Issue 9-10, Oct. 1, 1977, pp. 1052-1056.
"Calcium citrate", Wikipedia, May 22, 2017, p. 2, retrieved Apr. 16, 2019 at: https://en.wikipedia.org/w/index/php? title=Cialcium_citrate &oldid=781662190.

* cited by examiner

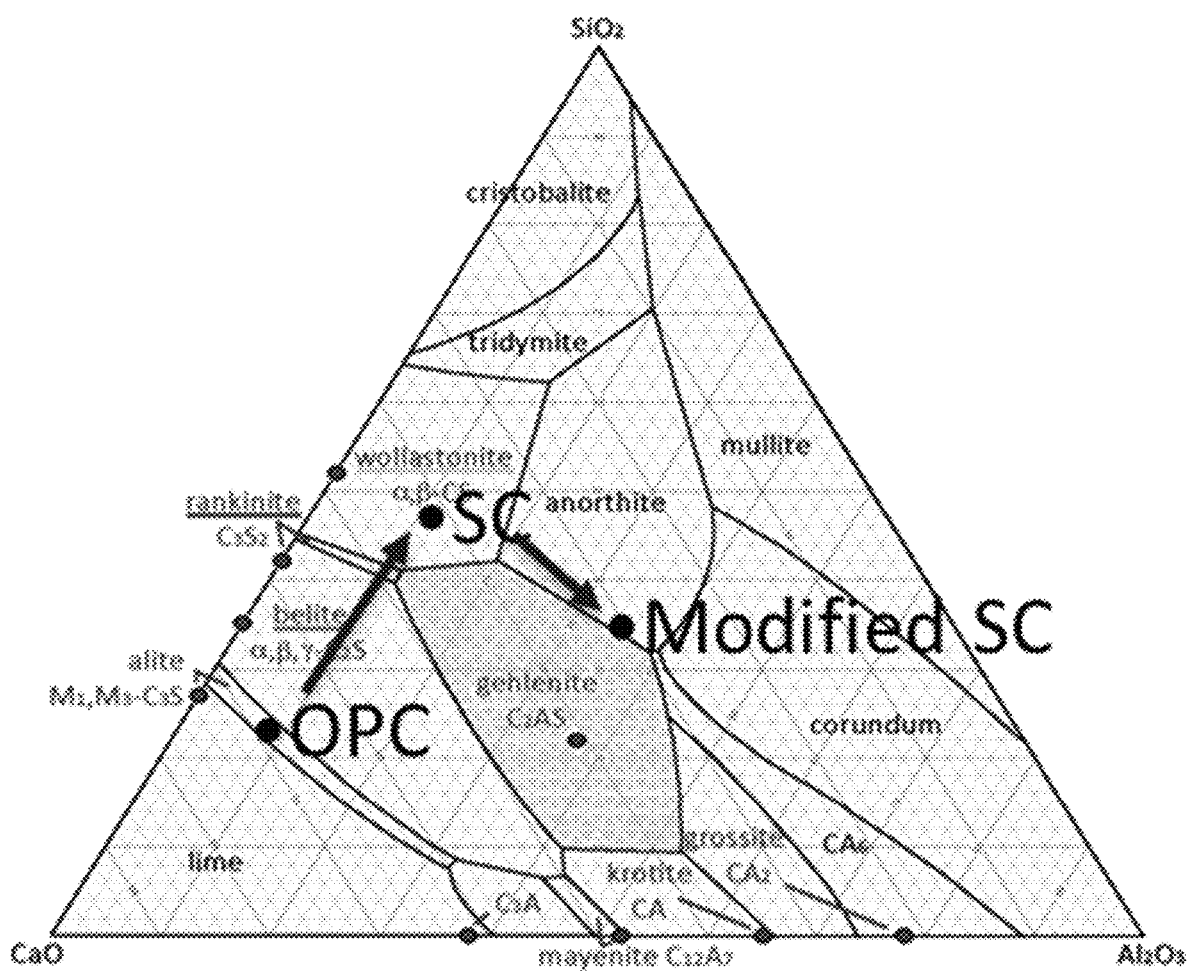

CEMENT CHEMISTRIES

FIELD

The invention generally relates to systems and processes for making articles of composite materials, and may include a two component binder system in which the first component utilizes liquid or solid chemicals that may be derived from $CO_2$ and the second component is composed of low Ca/Mg cement.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Concrete is omnipresent. Our homes likely rest on it, our infrastructure is built from it, as are most of our workplaces. Conventional concrete is made by mixing water and aggregates such as sand and crushed stone with ordinary portland cement ("OPC"), a synthetic material made by burning a mixture of ground limestone and clay, or materials of similar composition in a rotary kiln at a sintering temperature of around 1,450° C. OPC manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone. Conventional concrete production and use is not optimal in terms of both economics and environmental impact. Such conventional concrete production technologies involves large energy consumption and carbon dioxide emission, leading to an unfavorable carbon footprint. Furthermore, increasing scarcity of the supplies of limestone also negatively impacts the sustainability of the continued use of ordinary hydraulic cement formulations such as OPC.

Cement is typically made of limestone and shale to form the major phases of alite ($C_3S$ in cement chemist notation, $Ca_3SiO_5$, sometimes formulated as $3CaO.SiO_2$) and belite (C2S in cement chemist notation, $Ca_2SiO_4$, sometimes formulated as $2CaO.SiO_2$). Both alite and belite are rich in calcium and hydrate in the presence of water. OPC reacts with water to form calcium silicate hydrate phases and calcium hydroxide. The higher the calcium content in a calcium silicate phase, the more reactive it becomes. For example, $CaO.SiO_2$, which can take the form $CaSiO_3$, the mineral name Wollastonite, does not react with water. $3CaO.2SiO_2$, the mineral name rankinite does not react with water either. However, when the Ca/Si ratio increases to 2, $2CaO.SiO_2$, this calcium silicate phase reacts with water. When this ratio increases to 3, $3CaO.SiO_2$, the resulting phase reacts with water even faster. However, this increased reactivity comes with a cost. The more calcium used, the more $CO_2$ will be emitted because the source of calcium is calcium carbonate.

There have been several attempts to decrease the $CO_2$ emissions in the production and curing of OPC. The first approach is to increase the efficiency of the cement kilns. Today, the most efficient cement kiln can reduce the $CO_2$ emissions from 1 ton to 816 kg per ton of OPC. The second approach is to blend the cement clinker with supplementary cementitious materials ("SCM"), which are mainly fly ash, slag and sometimes with burnt oil shale. These SCM's are by-products of other processes. However, the major problem with SCM is the variation from source to source, abundance, and geographical dependence of the sources. The desire to reduce $CO_2$ has also been a factor leading to the development of carbonatable cement formulations having relatively low Ca content. Carbonatable cement refers to cement that is principally cured by reaction with carbon dioxide, $CO_2$, in any of its forms, such as, gaseous $CO_2$ in the presence of water, $CO_2$ in the form of carbonic acid, $H_2CO_3$, or in other forms that permit the reaction of $CO_2$ with the non-hydraulic cement material. The curing process sequesters carbon dioxide gas within the cured material, thus providing obvious environmental benefits. By way of example, Solidia Cement™ has been heralded as a breakthrough technology, having been recognized, for example, as one of the top 100 new technologies by the R&D 100 awards. The production of Solidia Cement™ reduces the $CO_2$ footprint by up to 70% when compared with portland cement and its use in traditional hydraulic concrete. In addition 80% of the water used in Solidia Cement™ based concrete making can be easily reclaimed and reused.

Although the above described curing mechanism of low Ca cement via a carbonation through exposure to carbon dioxide is advantageous and beneficial in many respects, in certain environments or applications, creating an atmosphere rich in carbon dioxide, and exposing the uncured cement or concrete to carbon dioxide, may be impractical or undesirable. Therefore, there is a need for providing cement formulations and compositions that may, under normal circumstances do not possess reactivity with water, with the capability of curing when exposed to water, yet also possess a more favorable environmental profile than conventional hydraulic OPC chemistries.

While certain aspects of conventional technologies have been discussed to facilitate disclosure of the invention, Applicants in no way disclaim these technical aspects, and it is contemplated that the claimed invention may encompass or include one or more of the conventional technical aspects discussed herein.

SUMMARY

In the present disclosure, it is expected that one can react a low Ca/Mg cement that does not normally react with water, with a reagent chemical (e.g., that may be synthesized from $CO_2$), to make a cured material. The advantage of this approach is lower $CO_2$ emission in the cement production by about 30% due to synthesis of low Ca/Mg cement, and additional $CO_2$ consumption during reaction of the reagent chemical with the low Ca/Mg cement.

The general reaction can be written as: Low Ca/Mg cement composition+Reagent chemical→Insoluble calcium compound+$SiO_2$ complex.

A number of aspects of the present invention will now be described. It should be understood that the inventors contemplate that any of features or aspects of the present invention listed below, or elsewhere described herein, can be combined in any order and in any number, with any other feature or aspect of the present invention.

According to certain aspects, the invention provides a method of curing a low Ca/Mg cement composition, including the steps of: providing a predetermined quantity of the low Ca/Mg cement composition in uncured form; and reacting the uncured low Ca/Mg cement composition with a reagent chemical for a time sufficient to cure said cementitious material, wherein said reagent chemical is a compound comprises one or more of: dicarboxylic acids, tricarboxylic acids, alpha-hydroxycarboxylic acids, salts of dicarboxylic acids, salts of tricarboxylic acids, or salts of alpha-hydroxycarboxylic acids.

The reagent chemical can be citric acid or a salt of citric acid.

The reagent chemical can be water soluble.

The reagent chemical can have a solubility in water of 20 g/L or more.

The method may further include controlling the reaction between the cementitious material and the reagent chemical by one or more of: the use of additives, by controlling the reactivity of the cementitious material by controlling its crystallinity, by control of a particle size of particles in the cementitious material, by control of the surface area of the particles in the cementitious material, or by control of the composition of the cementitious material.

The low Ca/Mg cement composition can be based on wollastonite, melilite, anorthite, olivine, or a combination of them.

The reaction between the low Ca/Mg cement composition and the reagent chemical can form an insoluble calcium or magnesium compound and a $SiO_2$ and/or $Al_2O_3$ complex as reaction products.

The reaction products can have a solubility in water of about 4 g/L or less.

The insoluble calcium or magnesium compound may include one or more of: anhydrous calcium carboxylate, hydrous calcium carboxylate, anhydrous magnesium carboxylate, hydrous magnesium carboxylate, anhydrous aluminum carboxylate, or hydrous aluminum carboxylate, or combinations thereof.

The $SiO_2$ and/or $Al_2O_3$ complex can include one or more of: amorphous silica, amorphous alumina, amorphous alumina silicate, or alumina silicate, or combinations thereof.

The insoluble calcium or magnesium compound and $SiO_2$ and/or $Al_2O_3$ complex can have a solubility in water of about 4 g/L or less.

The low Ca/Mg cement can be based on wollastonite, the reagent chemical can comprise citric acid or a salt of citric acid, and the reaction between the low Ca/Mg cement composition and the reagent chemical can form calcium citrate, $SiO_2$ and $H_2O$, as reaction products.

The calcium citrate and the $SiO_2$ can have a solubility in water of about 4 g/L or less.

The method of curing a cementitious material may further include synthesizing the reagent chemical from $CO_2$.

The method of curing a cementitious material may further include reacting the uncured low Ca/Mg cement composition with the reagent chemical in the presence of water.

BRIEF DESCRIPTION OF THE DRAWING

The objects and features of the invention can be better understood with reference to the drawing described below, and the claims. The drawing is not necessarily to scale, emphasis instead generally being placed upon illustrating the principles of the invention.

FIG. 1 is a phase diagram for cement illustrating certain principles upon which the present invention is based.

DETAILED DESCRIPTION

As used herein, the singular forms "a", "an" and "the" are intended to include the plural forms as well, unless the context clearly indicates otherwise. The use of "or" is intended to include "and/or", unless the context clearly indicates otherwise. Additionally, the use of "and" is intended to encompass "and/or," unless the context clear indicates otherwise.

As used herein, "about" is a term of approximation and is intended to include minor variations in the literally stated amounts, as would be understood by those skilled in the art. Such variations include, for example, standard deviations associated with techniques commonly used to measure the recited amounts.

All of the numerical values contained in this disclosure are to be construed as being characterized by the above-described modifier "about," are also intended to include the exact numerical values disclosed herein. The ranges disclosed herein should be construed to encompass all values within the upper and lower limits of the ranges, unless indicated otherwise. Moreover, all ranges include the upper and lower limits.

As used herein, "cementitious" means a material that includes reactive filler material like vitreous calcium alumino silicate, fly ash, slag and ordinary Portland cement (OPC), non-reactive filler like fine limestone powder, silica fume and glass powder.

As used herein, "low Ca/Mg cement" means cements with a Ca/Si or Mg/Si atomic ratio less than 2.

As used herein, "based on" means a component that makes up greater than 50% by weight of the total composition, or greater than 50% by weight of a distinct constituent of the total composition.

Different types of low Ca/Mg cement that set under activation with a reagent chemical are described herein. One chemistry is based on wollastonite, another based on melilite (e.g., gehlenite), another based on anorthite, and another based on olivine.

In some embodiments, the starting materials to synthesize these new chemistries are expected to be raw materials used in cement production such as limestone and shale, clay sand, and the like. FIG. 1 is a phase diagram for calcium silicate based cement. As described herein, the reactivity of the cement phases with water decreases along the illustrated progression from belite to SC ($SiO_2$.CaO) to modified SC. However, along with this decrease in reactivity, a desirable reduction in the amount of $CO_2$ emissions is also possible. Similar behaviors can be attributed to magnesium silicate based cements.

Wollastonite

Wollastonite has a molecular formula $CaSiO_3$ and its theoretical composition consists of 48.28% CaO and 51.72% $SiO_2$.

Melilite

Melilite refers to a mineral of the melilite group. Minerals of the group are solid solutions of several end members, the most important of which are gehlenite and åkermanite. A generalized formula for common melilite is $(Ca,Na)_2(Al, Mg,Fe^{2+})[(Al,Si)SiO_7]$. To synthesize gehlenite ($Ca_2Al_2SiO_7$), also referred to as melilite, it is expected that one can adjust the calcium, silicon and aluminum content in the raw materials to an advantageous composition and fire them. One can do chemical analysis on the starting materials, which are expected to be by-products that would normally be considered to be waste materials. The starting compositions can be prepared taking into account the results of the chemical analysis. The chemical analysis can be performed in any convenient matter, such as wet chemistry, x-ray diffraction analysis, and EDAX. In some embodiments, it is expected that there will be some impurities such as iron, sodium, potassium, and other materials. This target chemistry will yield a reduction of ~40% in $CO_2$ emissions compared to OPC produced in the most efficient kiln today.

It is expected that in some embodiments, the major phases that are produced will be crystalline gehlenite and amorphous calcium aluminum silicate. It is expected that in some embodiments, there will be minor phases (i.e., less than 20 wt %, or less than 15 wt %, or less than 12 wt %, or less than 7 wt %, or less than 5 wt %, or less than 3 wt %) including one or more of residual silica, free lime, C2S (belite $Ca_2SiO_4$), CS (Wollastonite $CaSiO_3$), and C3S2 (rankinite $Ca_3Si_2O_7$).

Anorthite

To synthesize anorthite ($CaAl_2Si_2O_8$), it is expected that one can adjust the calcium, silicon and aluminum content in the raw materials to an advantageous composition and fire them. One can do chemical analysis on the starting materials, which are expected to be by-products that would normally be considered to be waste materials. The starting compositions can be prepared taking into account the results of the chemical analysis. The chemical analysis can be performed in any convenient matter, such as wet chemistry, x-ray diffraction analysis, and EDAX. In some embodiments, it is expected that there will be some impurities such as iron, sodium, potassium, and other materials. This target chemistry will yield a reduction of ~60% in $CO_2$ emissions compared OPC produced in the most efficient kiln today.

It is expected that in some embodiments, the major phases that are produced will be crystalline anorthite and amorphous calcium aluminum silicate. It is expected that in some embodiments, there will be minor phases (probably less than 7%) including one or more of residual silica, free lime, C2S (belite $Ca_2SiO_4$), CS (Wollastonite $CaSiO_3$), and C3S2 (rankinite $Ca_3Si_2O_7$).

Olivine

Olivine refers to a group of compounds in which Fe and Mg substitute for one another in the same crystalline structure, and has the general chemical formula $(Mg,Fe)_2SiO_4$. Calcium (Ca), manganese (Mn) or nickel (Ni) can also substitute for Fe and/or Mg, so there are several series in the greater olivine group of which fayalite and forsterite are the most common members.

Low Ca/Mg Cement Compositions

The process of producing the cement includes the reactions (e.g., through calcination) to produce wollastonite, melilite (e.g., gehlenite), anorthite, or olivine.

The calcined low Ca/Mg cement material (i.e., clinker) can be milled to provide particle sizes of the new cement mixtures that are similar to that of OPC, or smaller.

In alternative embodiments, the low Ca/Mg cement composition based on wollastonite, melilite (e.g., gehlenite), anorthite, or olivine, may further comprise Al (aluminum), Si (silicon), and/or Mg (magnesium), impurities such as Sr (strontium) or Ba (barium) and other metal ions.

Curing Process

It is envisioned that one can react a low Ca/Mg cement composition, such as one or more of the cement compositions described above, with a reagent chemical (e.g., that may be synthesized from $CO_2$) to make a cured material. The advantage of this approach is lower $CO_2$ emission in the cement production by about 30% due to synthesis of low Ca/Mg cement, and additional $CO_2$ consumption during reaction of the reagent chemical with the low Ca/Mg cement.

The general reaction can be written as:

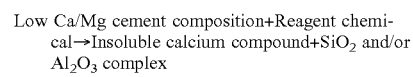

Low Ca/Mg cement composition+Reagent chemical→Insoluble calcium compound+$SiO_2$ and/or $Al_2O_3$ complex According to further aspects, the general reaction can be specified as:

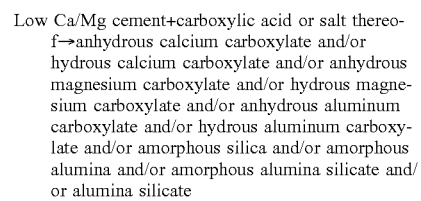

Low Ca/Mg cement+carboxylic acid or salt thereof→anhydrous calcium carboxylate and/or hydrous calcium carboxylate and/or anhydrous magnesium carboxylate and/or hydrous magnesium carboxylate and/or anhydrous aluminum carboxylate and/or hydrous aluminum carboxylate and/or amorphous silica and/or amorphous alumina and/or amorphous alumina silicate and/or alumina silicate In some embodiments, the reaction takes place in the presence of water. In various embodiments, water may or may not be consumed during the reaction depending on the product formed.

The reagent chemical may possess a certain minimum solubility in water. For example, the solubility of the reagent chemical is greater than or equal to 20 g of reagent chemical/1 L of water (20 g/L). In addition, the reagent chemical may be selected such that the products of the reaction with low Ca/Mg cement compositions is equal to or less than 4 g of reaction products/1 L of water (4 g/L).

Examples of reagent chemicals also include dicarboxylic acids, tricarboxylic acids, and alpha-hydroxycarboxylic acids, as well as salts thereof.

Examples of dicarboxylic acids include:

| Common name | IUPAC name |
|---|---|
| Malonic acid | propanedioic acid |
| Succinic acid | butanedioic acid |
| Glutaric acid | pentanedioic acid |
| Adipic acid | hexanedioic acid |
| Pimelic acid | heptanedioic acid |
| Suberic acid | octanedioic acid |
| Azelaic acid | nonanedioic acid |
| Sebacic acid | decanedioic acid |
| Nonamethylenedicarboxylic acid | undecanedioic acid |
| Decamethylenedicarboxylic acid | dodecanedioic acid |
| Brassylic acid | tridecanedioic acid |
| Thapsic acid | hexadecanedioic acid |

Examples of tricarboxylic acids include:

| Common name | IUPAC name |
|---|---|
| Citric acid | 2-hydroxypropane-1,2,3-tricarboxylic acid |
| Isocitric acid | 1-hydroxypropane-1,2,3-tricarboxylic acid |
| Aconitic acid | Prop-1-ene-1,2,3-tricarboxylic acid |
| Propane-1,2,3-tricarboxylic acid | Propane-1,2,3-tricarboxylic acid |
| Trimesic acid | benzene-1,3,5-tricarboxylic acid |

One specific example of a reagent chemical reaction is:

$CaSiO_3$+citric acid→Calcium citrate+$SiO_2$+$H_2O$

This reaction takes place in the presence of water.

Citric acid is an organic compound with the formula $C_6H_8O_7$, and the structural formula

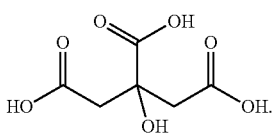

In general, in order to operate according to the principles of the invention, the reagent chemical preferably is sufficiently soluble in water to react with low Ca/Mg cement, and one reaction product should preferably be an insoluble calcium compound.

In certain embodiments, the reagent chemical is present in the cement composition in an amount of about 1 wt % or more relative to the total weight of the of the low Ca/Mg cement composition.

In certain embodiments, the reagent chemical is present in the cement composition in an amount of about 1 wt % to about 5 wt %, relative to the total weight of the of the low Ca/Mg cement composition.

In certain embodiments, the reagent chemical is present in the cement composition in an amount of about 5 wt % to about 10 wt %, relative to the total weight of the of the low Ca/Mg cement composition.

In certain embodiments, the reagent chemical is present in the cement composition in an amount accounting for about 10 wt % to about 25 wt % relative to the total weight of the of the low Ca/Mg cement composition.

In alternative embodiments, the low Ca/Mg cement composition my comprise Al (aluminum), Si (silicon), and/or Mg (magnesium), impurities such as Sr (strontium) or Ba (barium) and other metal ions, and the reaction product is an insoluble compound containing one or more of Al, Si, Mg, Sr and Ba.

For reactions that may be exothermic, it is believed that control of such reactions can be accomplished by one or more of: the use of additives, by controlling the reactivity of the cementitious material by controlling its crystallinity, by control of a particle size of particles in the cementitious material, and/or by control of the surface area of the particles in the cementitious material.

To control the reaction rate, one approach was to decrease the reactivity of the cement by increasing the melilite (i.e., gehlenite) content by increasing the Al and/or Mg and/or Fe content of the cement.

EXAMPLE

A 4"×8" cylinder is made with cement comprised of mainly melilite (i.e., gehlenite) crystalline phase 80%, 5% larnite and 12% amorphous phase. The particle size distribution of the cement is, $d_{10}$ 3 microns, $d_{50}$ 11 microns, and $d_{90}$ 75 microns. The mixture of cement, sand and gravel is mixed with saturated citric acid solution and cast into a mold. The sample is cured for two days and tested for compression strength in accordance with ASTM C39.

By making such adjustments to the cementitious material, in some instances the modified cementitious material (e.g., with added Al, Mg and/or Fe) is found not to cure under reaction with only $CO_2$ as the source of carbon dioxide, while it does react when the curing agent is citric acid, or some reagent chemical such as dicarboxylic acids, tricarboxylic acids, and alpha-hydroxycarboxylic acids.

In other embodiments, the reagent chemical can be an organic acid or a compound that can be synthesized from $CO_2$ alone or possibly with other precursor materials.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

Other embodiments within the scope of the claims herein will be apparent to one skilled in the art from consideration of the specification or practice of the disclosure as disclosed herein. It is intended that the specification be considered exemplary only, with the scope and spirit being indicated by the claims.

In view of the above, it will be seen that the several advantages are achieved and other advantages attained.

As various changes could be made in the above methods and compositions without departing from the scope of the disclosure, it is intended that all matter contained in the above description shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

Any numbers expressing quantities of ingredients, constituents, reaction conditions, and so forth used in the application are to be understood as being modified in all instances by the term "about." Notwithstanding that the numerical ranges and parameters setting forth, the broad scope of the subject matter presented herein are approximations, the numerical values set forth are indicated as precisely as possible. Any numerical value, however, may inherently contain certain errors or inaccuracies as evident, for example, from the standard deviation found in their respective measurement techniques. None of the features recited herein should be interpreted as invoking 35 U.S.C. § 112, 6, unless the term "means" is explicitly used.

I claim:

1. A method of producing a cured cement composition, comprising the steps of:
    providing a predetermined quantity of the low Ca/Mg cement composition in uncured form wherein the low Ca/Mg cement composition comprises at least one of:
        (i) crystalline gehlenite and amorphous calcium aluminum silicate; or (ii) crystalline anorthite and amorphous calcium aluminum silicate; and
    reacting the uncured low Ca/Mg cement composition with about 1 wt % or more relative to the total weight of the low Ca/Mg cement composition, of a reagent chemical for a time sufficient to cure said cementitious material,
wherein said reagent chemical is a compound consisting of one or more of: dicarboxylic acids, tricarboxylic acids, alpha-hydroxycarboxylic acids, salts of dicarboxylic acids, salts of tricarboxylic acids, or salts of alpha-hydroxycarboxylic acids, and
wherein the reaction between the low Ca/Mg cement composition and the reagent chemical forms an insoluble calcium or magnesium compound and a $SiO_2$ and/or $Al_2O_3$ complex as reaction products.

2. The method of claim 1, wherein said reagent chemical is citric acid or a salt of citric acid.

3. The method of claim 1, wherein said reagent chemical is water soluble.

4. The method of claim 1, further comprising controlling the reaction between the cementitious material and the reagent chemical by one or more of:
the use of additives,
by controlling the reactivity of the cementitious material by controlling its crystallinity,
by control of a particle size of particles in the cementitious material,
by control of the surface area of the particles in the cementitious material, or
by control of the composition of the cementitious material.

5. The method of claim 1, wherein the low Ca/Mg cement composition is based on wollastonite, gehlenite, anorthite, olivine, or a combination of them.

6. The method of claim 1, wherein the insoluble calcium or magnesium compound comprises one or more of: anhydrous calcium carboxylate, hydrous calcium carboxylate, anhydrous magnesium carboxylate, hydrous magnesium carboxylate, anhydrous aluminum carboxylate, or hydrous aluminum carboxylate, or combinations thereof.

7. The method of claim 6, wherein the $SiO_2$ and/or $Al_2O_3$ complex comprises one or more of: amorphous silica, amorphous alumina, amorphous alumina silicate, or alumina silicate, or combinations thereof.

8. The method of claim 1, further comprising synthesizing the reagent chemical from $CO_2$.

9. The method of claim 1, wherein the reacting the uncured low Ca/Mg cement composition with the reagent chemical is performed in the presence of water.

10. The method of claim 1, wherein the low Ca/Mg cement composition is based on gehlenite, anorthite, olivine, or a combination of them.

11. The method of claim 1, further comprising:
synthesizing the low Ca/Mg cement composition in uncured form by calcining raw materials.

12. The method of claim 11, wherein the raw materials comprise one or more of: limestone, shale, and clay sand.

13. The method of claim 11, wherein the low Ca/Mg cement has a Ca/Si or Mg/Si atomic ratio less than 2.

14. The method of claim 11, further comprising:
performing a chemical analysis of the raw materials.

15. The method of claim 1, wherein the low Ca/Mg cement composition is based on gehlenite.

16. The method of claim 1, wherein the low Ca/Mg cement composition comprises crystalline gehlenite and amorphous calcium aluminum silicate.

17. The method of claim 1, wherein the low Ca/Mg cement composition contains more than 50% by weight of the gehlenite, based on the total weight of the low Ca/Mg cement.

18. The method of claim 17, wherein the low Ca/Mg cement composition further comprises less than 20 wt % of one or more of silica, free lime, belite, wollastonite, and rankinite.

19. The method of claim 1, wherein the low Ca/Mg cement composition comprises crystalline anorthite and amorphous calcium aluminum silicate.

20. The method of claim 19, wherein the low Ca/Mg cement composition further comprises less than 7% of one or more of silica, free lime, belite, wollastonite, and rankinite.

21. The method of claim 1, wherein the low Ca/Mg cement composition does not cure under reaction with $CO_2$ alone.

22. A method of forming a cured concrete material comprising:
mixing aggregate with a predetermined quantity of a low Ca/Mg cement composition in uncured form, wherein the low Ca/Mg cement composition comprises at least one of: (i) crystalline gehlenite and amorphous calcium aluminum silicate; or (ii) crystalline anorthite and amorphous calcium aluminum silicate;
reacting the uncured low Ca/Mg cement composition with about 1 wt % or more, relative to the total weight of the low Ca/Mg cement composition, of a reagent chemical for a time sufficient to cure said cementitious material,
wherein said reagent chemical is a compound consisting of one or more of: dicarboxylic acids, tricarboxylic acids, alpha-hydroxycarboxylic acids, salts of dicarboxylic acids, salts of tricarboxylic acids, or salts of alpha-hydroxycarboxylic acids, and
wherein the reaction between the low Ca/Mg cement composition and the reagent chemical forms an insoluble calcium or magnesium compound and a $SiO_2$ and/or $Al_2O_3$ complex as reaction products.

23. The method of claim 22, wherein the low Ca/Mg cement composition further comprises less than 12 wt % of one or more of silica, free lime, belite, wollastonite, and rankinite.

24. A method of producing a cured cement composition, comprising the steps of:
providing a predetermined quantity of the low Ca/Mg cement composition in uncured form wherein the low Ca/Mg cement composition comprises at least one of: (i) crystalline gehlenite and amorphous calcium aluminum silicate; or (ii) crystalline anorthite and amorphous calcium aluminum silicate; and
reacting the uncured low Ca/Mg cement composition with about 1 wt % or more, relative to the total weight of the low Ca/Mg cement composition, of a reagent chemical for a time sufficient to cure said cementitious material,
wherein said reagent chemical is a compound consisting of one or more of: dicarboxylic acids, tricarboxylic acids, alpha-hydroxycarboxylic acids, salts of dicarboxylic acids, salts of tricarboxylic acids, or salts of alpha-hydroxycarboxylic acids.

* * * * *